(12) United States Patent
Sato et al.

(10) Patent No.: US 10,744,974 B2
(45) Date of Patent: Aug. 18, 2020

(54) WEBBING TAKE-UP DEVICE (71) Applicant: KABUSHIKI KAISHA TOKAI-RIKA-DENKI-SEISAKUSHO, Aichi-ken (JP)

(72) Inventors: Takamasa Sato, Aichi-ken (JP); Takahiro Osaki, Aichi-ken (JP); Yuya Nagata, Aichi-ken (JP); Tomonari Umakoshi, Aichi-ken (JP); Takuhiro Saito, Aichi-ken (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 187 days.

(21) Appl. No.: 16/014,500

(22) Filed: Jun. 21, 2018

(65) Prior Publication Data
US 2019/0001923 A1    Jan. 3, 2019

(30) Foreign Application Priority Data

Jun. 28, 2017 (JP) ................. 2017-126684

(51) Int. Cl.
*B60R 22/46* (2006.01)
*B60R 22/34* (2006.01)

(52) U.S. Cl.
CPC ............ *B60R 22/46* (2013.01); *B60R 22/34* (2013.01); *B60R 2022/3402* (2013.01)

(58) Field of Classification Search
CPC .. B60R 22/34; B60R 22/46; B60R 2022/3402
See application file for complete search history.

(56) References Cited

U.S. PATENT DOCUMENTS

| 4,159,809 A * | 7/1979 | Rawson ................. B60R 22/34 185/45 |
| 4,995,567 A * | 2/1991 | Ballet ..................... B60R 22/34 242/375.2 |
| 6,318,585 B1 | 11/2001 | Asagiri et al. |
| 2005/0224621 A1 * | 10/2005 | Mori ...................... B60R 22/44 242/374 |

(Continued)

FOREIGN PATENT DOCUMENTS

| JP | S58-13262 U | 1/1983 |
| JP | 2000-289570 A | 10/2000 |
| JP | 2012-228933 A | 11/2012 |

(Continued)

OTHER PUBLICATIONS

Japanese Office Action issued in the corresponding Japanese Application No. 2017-126684 dated Aug. 28, 2018.

*Primary Examiner* — Sang K Kim
(74) *Attorney, Agent, or Firm* — Roberts Calderon Safran & Cole, P.C.

(57) ABSTRACT

In a webbing take-up device, a cover member is disposed on the inner side of a second peripheral wall of a second housing member. Due thereto, an outer side surface of a third peripheral wall of the cover member and an inner side surface of the second peripheral wall of the second housing member oppose each other in a radial direction of urging, which is a radial direction of rotation of rotational urging force of a flat spiral spring, so displacement of the cover member outward in the radial direction of urging can be suppressed.

7 Claims, 5 Drawing Sheets

(56) References Cited

U.S. PATENT DOCUMENTS

2005/0284977 A1* 12/2005 Specht .................... B60R 22/44
                                                         242/374
2014/0145022 A1    5/2014 Tombe et al.

FOREIGN PATENT DOCUMENTS

| JP | 2012-232677 A | 11/2012 |
| JP | 2013-184538 A | 9/2013 |

* cited by examiner

WEBBING TAKE-UP DEVICE

CROSS-REFERENCE TO RELATED APPLICATION

This application claims priority under 35 USC 119 from Japanese Patent Application No. 2017-126684 filed Jun. 28, 2017, the disclosure of which is incorporated by reference herein.

BACKGROUND

Field of the Invention

The present disclosure relates to a webbing take-up device that takes up webbing of a seat belt device.

Related Art

Japanese Patent Application Laid-open (JP-A) No. 2012-232677 and JP-A No. 2012-228933, for example, disclose webbing take-up devices where an urging member such as a spiral spring is provided on the inside of a cover member called a spring case, for example, and where a spool of the webbing take-up device is urged, by rotational urging force of the urging member, in a take-up direction in which the spool takes up the webbing. When the cover member receives a load from inside by the urging member or the like, there is the potential for the cover member to be displaced (including deformation) outward in the radial direction of urging, which is the radial direction of rotation of the rotational urging force of the urging member.

SUMMARY

In consideration of the circumstances described above, a webbing take-up device that can suppress displacement of the cover member toward outside in the radial direction of urging caused by a load from the inside of the cover member is obtained.

A webbing take-up device of a first aspect includes: a device body having a spool on which a webbing is taken up and stored; an urging member that urges the spool in a take-up direction by rotational urging force; a cover member that is provided at the device body and inside which the urging member is disposed; and a suppressing portion that is configured to suppress displacement of the cover member toward an outside in a radial direction of urging, which is a radial direction of rotation of the rotational urging force.

According to the webbing take-up device of the first aspect, the suppressing portion is capable of suppressing displacement of the cover member outward in the radial direction of urging, which is the radial direction of rotation of the rotational urging force of the urging member. For this reason, displacement of the cover member outward in the radial direction of urging, including deformation of the cover member outward in the radial direction of urging when the cover member has been pushed from inside by the urging member or the like, can be suppressed.

A webbing take-up device of a second aspect is the webbing take-up device of the first aspect, wherein the suppressing portion is a placement portion that is provided at the device body, the cover member and the urging member being disposed inside the placement portion, and the placement portion opposing the cover member from outside in the radial direction of urging.

According to the webbing take-up device of the second aspect, the suppressing portion is the placement portion inside which the cover member and the urging member are disposed, and the placement portion opposes the cover member from outside in the radial direction of urging. For this reason, in a case where the cover member has been pushed from inside by the urging member or the like, displacement of the cover member outward in the radial direction of urging, including deformation of the cover member outward in the radial direction of urging, can be suppressed by the placement portion.

A webbing take-up device of a third aspect is the webbing take-up device of the first aspect or the second aspect, wherein the suppressing portion is a housing portion that is provided at the device body, that houses a member different from the cover member and the urging member, and that opposes the cover member from outside in the radial direction of urging.

According to the webbing take-up device of the third aspect, the suppressing portion is a housing portion that houses the member different from the cover member and the urging member inside, and the housing portion opposes the cover member from outside in the radial direction of urging. For this reason, in a case where the cover member has been pushed from inside by the urging member, displacement of the cover member outward in the radial direction of urging, including deformation of the cover member outward in the radial direction of urging, can be suppressed by the housing portion.

A webbing take-up device of a fourth aspect is the webbing take-up device of any one of the first aspect to the third aspect, wherein the suppressing portion is configured to guide the cover member to an attachment position in the device body at which the cover member is attached by the cover member being engaged with the suppressing portion when attaching the cover member to the device body.

According to the webbing take-up device of the fourth aspect, the suppressing portion can guide the cover member to an attachment position in the device body at which the cover member is attached by the cover member being engaged with the suppressing portion when attaching the cover member to the device body. For this reason, attachment of the cover member to the device body becomes easy.

A webbing take-up device of a fifth aspect is the webbing take-up device of any one of the first aspect to the fourth aspect, wherein the suppressing portion is configured to suppress displacement of the cover member toward an inside in the radial direction of urging.

According to the webbing take-up device of the fifth aspect, the suppressing portion is capable of suppressing displacement of the cover member inward in the radial direction of urging. For this reason, displacement of the cover member inward in the radial direction of urging, including deformation of the cover member inward in the radial direction of urging, caused by a load applied to the cover member from the outside of the cover member can be suppressed.

As described above, in the webbing take-up device, displacement of the cover member outward in the radial direction of urging caused by a load from the inside of the cover member can be suppressed.

BRIEF DESCRIPTION OF THE DRAWINGS

An exemplary embodiment will be described in detail with reference to the following figures, wherein.

DETAILED DESCRIPTION

Next, an exemplary embodiment will be described on the basis of FIG. 1 to FIG. 3B. In the drawings, arrow FR indicates a forward direction of a vehicle to which a webbing take-up device 10 is applied, arrow OUT indicates an outward direction in the vehicle width direction, and arrow UP indicates the vehicle upward direction.

Configuration of Exemplary Embodiment

Figure 1:
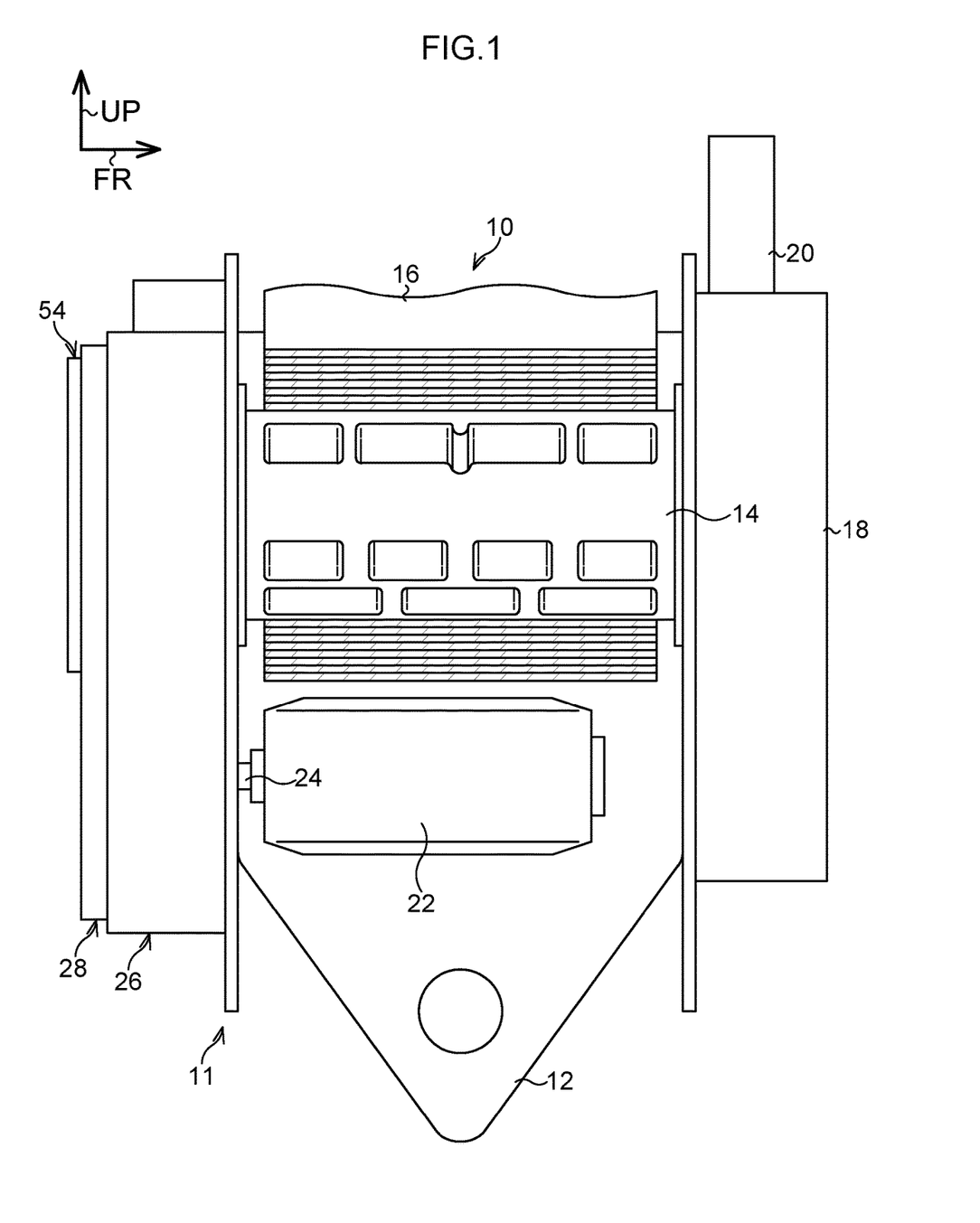
FIG. 1 is a general front view of a webbing take-up device pertaining to the exemplary embodiment.

As shown in FIG. 1, the webbing take-up device 10 pertaining to the exemplary embodiment is equipped with a frame 12 that configures a device body 11. The frame 12 is fixed to the vehicle lower side section of a center pillar (not shown in the drawings) serving as a vehicle body of the vehicle. The frame 12 is provided with a spool 14. The spool 14 is formed in a substantially cylindrical shape, a direction of a central axis of the spool 14 coincides substantially with the vehicle front and rear direction, and the spool 14 is rotatable about its central axis.

A longitudinal direction base end portion of a long band-like webbing 16 is anchored to the spool 14. When the spool 14 is rotated in a take-up direction, the webbing 16 is taken up on the spool 14 from its longitudinal direction base end side. Furthermore, a longitudinal direction distal end side of the webbing 16 extends in the vehicle upward direction from the spool 14, passes through a slit hole formed in a through anchor (not shown in the drawings) supported by the center pillar on the vehicle upper side of the frame 12, and turns back in the vehicle downward direction.

Moreover, the longitudinal direction distal end portion of the webbing 16 is anchored to an anchor plate (not shown in the drawings). The anchor plate is formed by a member made of a metal such as iron and is fixed to, for example, the floor (not shown in the drawings) of the vehicle or a frame member of the seat (not shown in the drawings) corresponding to the webbing take-up device 10.

Furthermore, a vehicle seat belt device to which the webbing take-up device 10 is applied is equipped with a buckle device (not shown in the drawings). The buckle device is provided on the vehicle width direction inner side of the seat to which the webbing take-up device 10 is applied. An occupant sitting in the seat pulls out the webbing 16 from the spool 14, puts the webbing 16 around his/her body, and causes a tongue (not shown in the drawings) provided on the webbing 16 to engage with the buckle device, whereby the webbing 16 becomes fastened across the body of the occupant.

A lock mechanism 18 that configures the device body 11 is provided on the vehicle front side of the frame 12. The lock mechanism 18 is activated in a situation where the vehicle suddenly decelerates when, for example, there is an impact (collision) to the vehicle. When the lock mechanism 18 is activated, rotation of the spool 14 in a pull-out direction is limited. Furthermore, a pretensioner 20 that configures the device body 11 is provided on the vehicle front side of the frame 12. The pretensioner 20 is activated when there is a vehicle emergency such as when, for example, there is an impact (collision) to the vehicle. When the pretensioner 20 is activated, the spool 14 is forcibly rotated in the take-up direction.

Moreover, the spool 14 is provided with a force limiter mechanism. When the rotational force of the spool 14 in the pull-out direction exceeds a predetermined magnitude in a state in which rotation of the spool 14 in the pull-out direction is prevented (locked) by the lock mechanism 18, the spool 14 is rotated in the pull-out direction while an energy absorbing member of the force limiter mechanism becomes deformed. The webbing 16 is pulled out from the spool 14 by an amount corresponding to the amount of rotation of the spool 14 in the pull-out direction, and a part of the rotational force of the spool 14 in the pull-out direction is supplied to the deformation of the energy absorbing member and is absorbed.

The webbing take-up device 10 is equipped with a motor 22 serving as a drive member. The motor 22 is provided on the vehicle lower side of the spool 14. An output shaft 24 of the motor 22 passes through a hole formed in the frame 12 and projects in the vehicle rear direction from the frame 12.

Figure 2A:
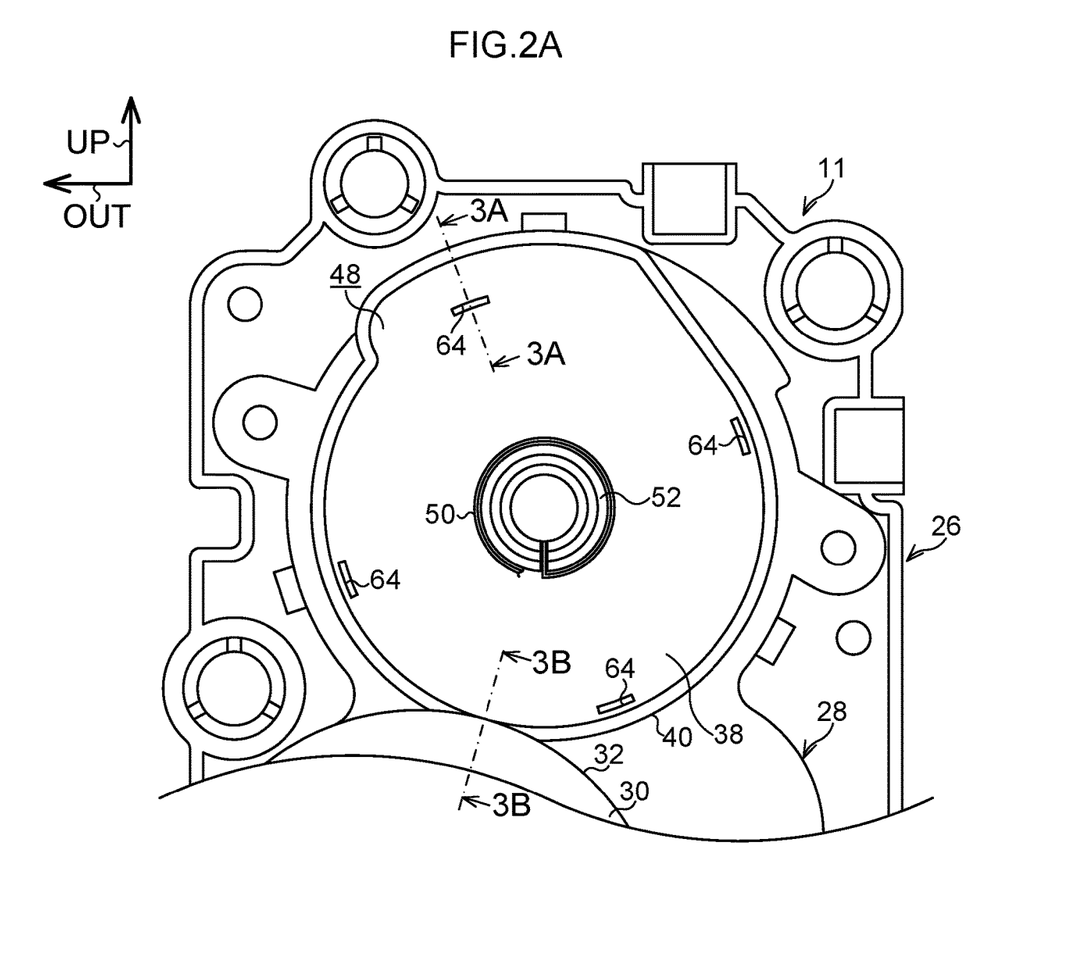
FIG. 2A is a side view of a second housing member as seen from a vehicle rear side.

Furthermore, a first housing member 26 that configures the device body 11 is provided on the vehicle rear side of the frame 12. Moreover, a second housing member 28 that configures the device body 11 is provided at the first housing member 26. As shown in FIG. 2A and FIG. 3B, the second housing member 28 is equipped with (includes) a first bottom wall 30. The first bottom wall 30 has plate shape (is tabular), and the thickness direction of the first bottom wall 30 coincides with the vehicle front and rear direction. A first peripheral wall 32 that configures a suppressing portion as a housing portion is provided on the outer peripheral side of the first bottom wall 30. The first peripheral wall 32 is annular and is disposed along the outer peripheral portion of the first bottom wall 30. As shown in FIG. 3B, the inside of the first peripheral wall 32 is a first gear housing portion 34, and a gear 36 is housed in the first gear housing portion 34.

Figure 3A:
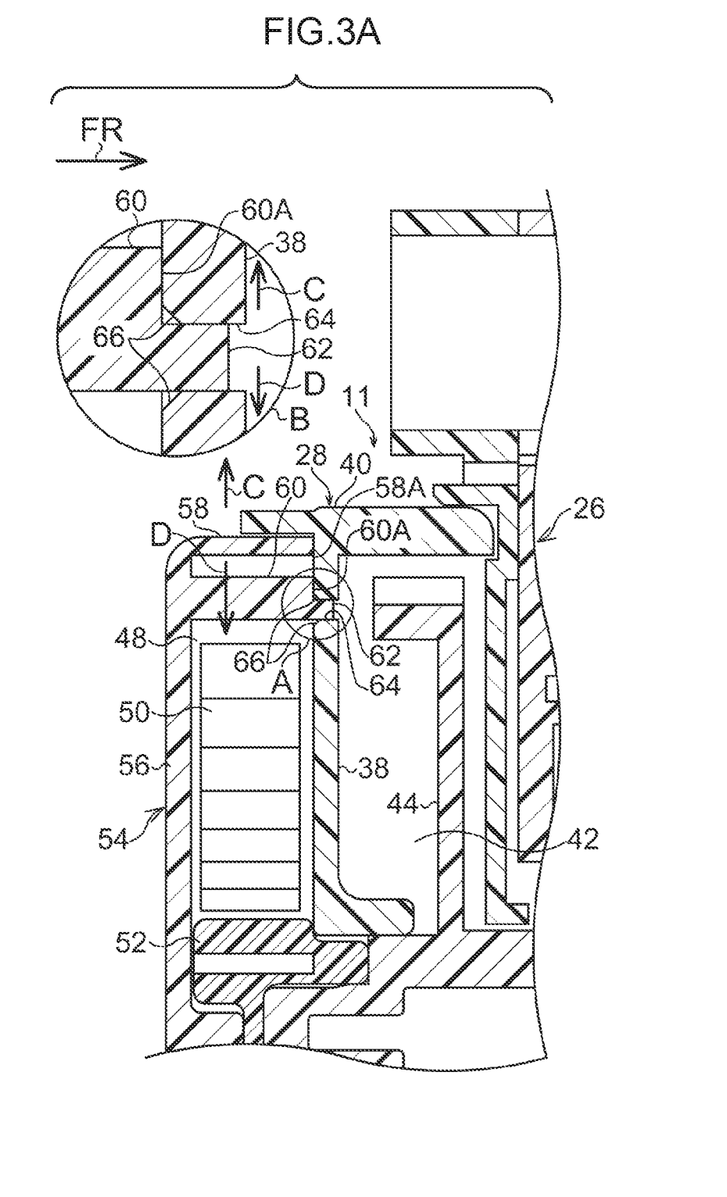
FIG. 3A is a sectional view of the second housing member, the cover member, etc. along line 3A-3A in FIG. 2A and FIG. 2B, with circle B in FIG. 3A being an enlarged view of the section in circle A in FIG. 3A.
Figure 3B:
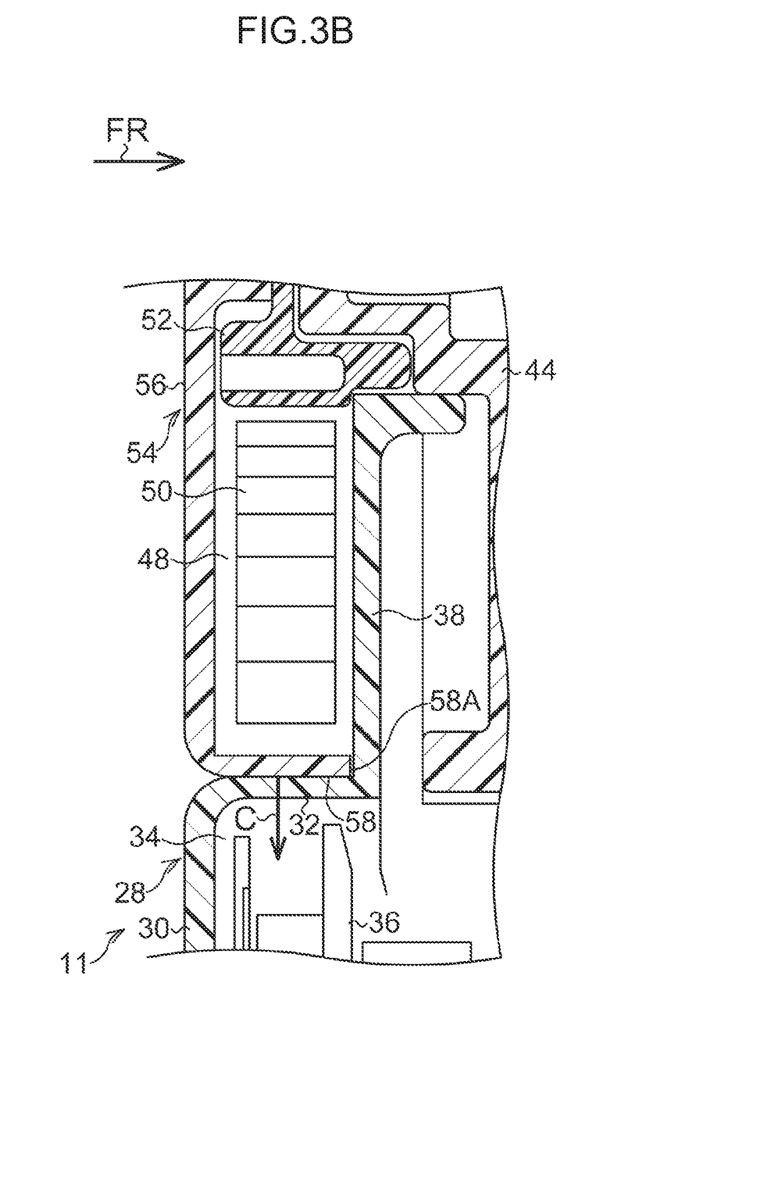
FIG. 3B is a sectional view of the second housing member, the cover member, etc. along line 3B-3B in FIG. 2A and FIG. 2B.

Furthermore, as shown in FIG. 2A, FIG. 3A, and FIG. 3B, the second housing member 28 is equipped with (includes) a second bottom wall 38. The second bottom wall 38 has plate shape (is tabular), and the thickness direction of the second bottom wall 38 coincides with the vehicle front and rear direction. The second bottom wall 38 is disposed further in the vehicle forward direction than the first bottom wall 30, and a second peripheral wall 40 that configures the suppressing portion as a placement portion is provided on the outer peripheral side of the second bottom wall 38. As shown in FIG. 2A, the second peripheral wall 40 is substantially C-shaped and is disposed along the outer peripheral portion of the second bottom wall 38. Both circumferential direction end portions of the second peripheral wall 40 are connected to the first peripheral wall 32. As shown in FIG. 3A, the inside of the second peripheral wall 40 is a second gear housing portion 42, and a gear 44 is provided therein.

The gear 36 inside the first gear housing portion 34 (see FIG. 3B) and the gear 44 inside the second gear housing portion 42 (see FIG. 3A and FIG. 3B) configure a speed reduction gear train serving as a speed reduction section or a rotational force transmission section. An input gear (not shown in the drawings) of the speed reduction gear train is mechanically coupled to the output shaft 24 of the motor 22. When the motor 22 is driven and the output shaft 24 of the motor 22 is rotated, the rotational force of the output shaft 24 of the motor 22 is transmitted to the speed reduction gear train. Moreover, an output gear that configures the speed reduction gear train is mechanically coupled to the spool 14, and the rotational force of the output shaft 24 of the motor 22 can be transmitted via the speed reduction gear train to the spool 14. When the rotational force of the output shaft 24 of the motor 22 is transmitted to the spool 14, the spool 14 is rotated in the take-up direction, for example, and the webbing 16 is taken up on the spool 14.

As shown in FIG. 3A, a portion of the second peripheral wall 40 of the second housing member 28, which is at the vehicle rear side than the vehicle front and rear direction middle portion of the second peripheral wall 40, is disposed further in the vehicle rearward direction than the second bottom wall 38. A portion which is inside the second peripheral wall 40 and which is on the vehicle rear side than the second bottom wall 38 is a spring placement portion 48, and a flat spiral spring (power spring) 50 serving as an urging member is housed in the spring placement portion 48. The flat spiral spring 50 is spiral shape. A shaft member 52 is provided on the spiraling direction inside of the flat spiral spring 50. As shown in FIG. 2A, the spiraling direction inside end portion of the flat spiral spring 50 is coupled to the shaft member 52. The shaft member 52 is coupled to the spool 14 directly or indirectly via the speed reduction gear train, for example.

Figure 2B:
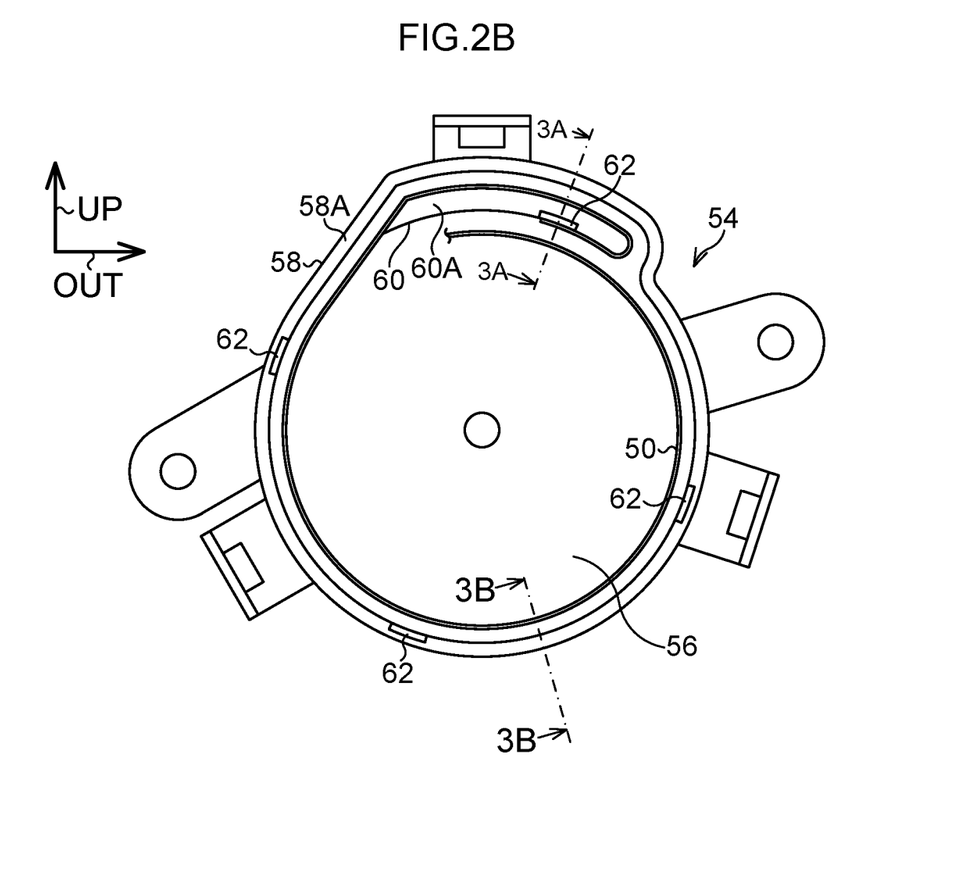
FIG. 2B is a side view of a cover member as seen from a vehicle front side.

Furthermore, as shown in FIG. 3A and FIG. 3B, a cover member 54 is disposed on the inside of the second peripheral wall 40 of the second housing member 28. As shown in FIG. 2B, FIG. 3A, and FIG. 3B, the cover member 54 is equipped with (includes) a third bottom wall 56. The thickness direction of the third bottom wall 56 coincides with the vehicle front and rear direction. A third peripheral wall 58 is provided on the outer peripheral side of the third bottom wall 56. The third peripheral wall 58 is annular and is formed along the outer peripheral portion of the third bottom wall 56. The third peripheral wall 58 extends in the vehicle forward direction from the vehicle front side surface of the third bottom wall 56. For this reason, the cover member 54 opens in the vehicle forward direction. Furthermore, as shown in FIG. 2B and FIG. 3A, the flat spiral spring 50 is disposed on the inside of the cover member 54. A catching (anchoring) piece 60 is formed on the vehicle front side surface of the third bottom wall 56 of the cover member 54. The spiraling direction outside end portion of the flat spiral spring 50 is caught (anchored) to the catching piece 60, and the spool 14 is urged in the take-up direction by the flat spiral spring 50.

Furthermore, in a state in which the cover member 54 is attached to the second housing member 28, the cover member 54 is entered on the inside of the second peripheral wall 40 of the second housing member 28. For this reason, the outer side surface of the third peripheral wall 58 of the cover member 54 and the inner side surface of the second peripheral wall 40 of the second housing member 28 oppose (face) each other in the radial direction of urging (the direction of arrow C and the direction of arrow D in FIG. 3A, etc.), which is the radial direction of rotation of the rotational urging force of the flat spiral spring 50 (in other words, in a diameter expansion direction or diameter reduction direction of the flat spiral spring 50, or in a direction perpendicular to the spiraling direction of the flat spiral spring 50). Moreover, between both circumferential direction end portions of the second peripheral wall 40 of the second housing member 28, the second peripheral wall 40 is connected to the first peripheral wall 32 of the second housing member 28. For this reason, in a state in which the cover member 54 is attached to the second housing member 28, between both circumferential direction end portions of the second peripheral wall 40, the outer side surface of the third peripheral wall 58 of the cover member 54 and the outer side surface of the first peripheral wall 32 oppose (face) each other in the radial direction of urging.

Moreover, as shown in FIG. 2B and FIG. 3A, projecting pieces 62 that configure the suppressing portion are provided at a vehicle front side end 58A of the third peripheral wall 58 of the cover member 54 and at a vehicle front side end 60A of the catching piece 60 of the cover member 54. The projecting pieces 62 project in the vehicle forward direction from the vehicle front side end 58A of the third peripheral wall 58 or the vehicle front side end 60A of the catching piece 60. Furthermore, the projecting pieces 62 are formed so as to extend along the radial direction inside edge portion of the vehicle front side end 58A of the third peripheral wall 58 or the radial direction inside edge portion of the vehicle front side end 60A of the catching piece 60.

As shown in FIG. 2A and FIG. 3A, hole portions 64 that configure the suppressing portion together with the projecting pieces 62 are formed in the second bottom wall 38 of the second housing member 28 in correspondence to the projecting pieces 62. In a state in which the cover member 54 is disposed on the inside of the second peripheral wall 40 of the second housing member 28 and the cover member 54 is attached to the second housing member 28, the projecting pieces 62 of the cover member 54 are entered (inserted) in (engaged with) the hole portions 64 of the second housing member 28.

Furthermore, as shown in FIG. 2A, a guide surface 66 is formed in the vehicle rear side end portion of the hole portion 64. The guide surface 66 is inclined in such a way as to become displaced outward of the hole portion 64 on progress toward the vehicle rearward. When attaching the cover member 54 to the second housing member 28, the distal ends (vehicle front side ends) of the projecting pieces 62 are brought into abutting contact with the guide surfaces 66 of the hole portions 64 of the second housing member 28. When the cover member 54 is moved in the vehicle forward direction in this state, the projecting pieces 62 are guided by the guide surfaces 66 of the hole portions 64 to predetermined attachment positions on the insides of the hole portions 64.

Operation and Effects of Exemplary Embodiment

In the vehicle seat belt device to which the webbing take-up device 10 is applied, when the webbing 16 is to be fastened across the body of the occupant sitting in the seat, the webbing 16 is pulled by the occupant and is pulled out from the spool 14. In a state in which the webbing 16 pulled out in this way has been put around the body of the occupant, the webbing 16 becomes fastened across the body of the occupant as a result of the tongue provided on the webbing 16 being engaged with the buckle device.

Furthermore, when the webbing 16 is pulled out from the spool 14 in this way, the spool 14 is rotated in the pull-out direction. The rotational force of the spool 14 in the pull-out direction is transmitted to the shaft member 52. When the shaft member 52 is rotated by this, the spiraling direction inside end portion of the flat spiral spring 50 is rotated. Due thereto, the urging force of the flat spiral spring 50 is increased. For this reason, when the tongue provided on the webbing 16 is disengaged from the buckle device, the spool 14 is rotated in the take-up direction by the urging force of the flat spiral spring 50, whereby the webbing 16 is taken up on the spool 14.

In the webbing take-up device 10, when the motor 22 is activated, the output shaft 24 of the motor 22 is rotated, the rotational force thereof is transmitted via the speed reduction gear train to the spool 14, and the spool 14 is rotated in the take-up direction. Due thereto, for example, when there is a vehicle emergency, slack in the webbing 16 is eliminated and the restraining force of the webbing 16 on the body of the occupant is increased.

In the webbing take-up device 10, the cover member 54 is disposed on the inner side of the second peripheral wall 40 of the second housing member 28. In the state in which the cover member 54 is disposed on the inner side of the second peripheral wall 40, the inner side surface of the second peripheral wall 40 and the outer side surface of the first peripheral wall 32 of the second housing member 28, and the outer side surface of the third peripheral wall 58 of the cover member 54 oppose each other in the radial direction of urging (the direction of arrow C and the direction of arrow D in FIG. 3A and FIG. 3B), which is the radial direction of rotation of the rotational urging force of the flat spiral spring 50.

Therefore, displacement of the cover member 54 (e.g., outward tilting of the cover member 54) outward in the radial direction of urging (the direction of arrow C in FIG. 3A and FIG. 3B), including deformation of the cover member 54 outward in the radial direction of urging, is suppressed by the inner side surface of the second peripheral wall 40 of the second housing member 28 or the outer side surface of the first peripheral wall 32. For this reason, for example, when the flat spiral spring 50 increases in diameter due to its own urging force, displacement of the cover member 54 outward in the radial direction of urging caused by the third peripheral wall 58 of the cover member 54 being pushed (pressed) by the flat spiral spring 50 can be suppressed.

Furthermore, as described above, the spiraling direction outside end portion of the flat spiral spring 50 is anchored to the catching piece 60 formed on the third bottom wall 56 of the cover member 54. Accordingly, due to displacement of the cover member 54, caused by the third peripheral wall 58 of the cover member 54 being pushed (pressed) by the flat spiral spring 50, being suppressed, the catching piece 60 of the cover member 54 can be suppressed from becoming relatively displaced in the radial direction of the shaft member 52 with respect to the shaft member 52 which is inside the second peripheral wall 40 of the second housing member 28, and variations (fluctuations) of the urging force of the flat spiral spring 50 caused by relative displacement of the catching piece 60 with respect to the shaft member 52 can be suppressed. Because fluctuations in the urging force of the flat spiral spring 50 can be suppressed, variations (fluctuations) in torque when the spool 14 is rotated in the take-up direction by the urging force of the flat spiral spring 50 can be suppressed.

Furthermore, for example, in a configuration where the second peripheral wall 40 is provided in such a way that the entire region along the circumferential direction of the outer peripheral surface of the third peripheral wall 58 of the cover member 54 opposes the inner side surface of the second peripheral wall 40 of the second housing member 28, the first peripheral wall 32 of the second housing member 28 is provided adjacent to the second peripheral wall 40 on the outer side of the second peripheral wall 40. In contrast to this configuration, in the present exemplary embodiment, both circumferential direction end portions of the second peripheral wall 40 are connected to the first peripheral wall 32, and between both circumferential direction end portions of the second peripheral wall 40, the outer side surface of the third peripheral wall 58 of the cover member 54 opposes the outer side surface of the first peripheral wall 32. Due thereto, displacement of the cover member 54 outward in the radial direction of urging (the direction of arrow C in FIG. 3B), which is the radial direction of rotation of the rotational urging force of the flat spiral spring 50, is suppressed. For this reason, in comparison to a configuration where the second peripheral wall 40 is provided in such a way that the entire region along the circumferential direction of the outer peripheral surface of the third peripheral wall 58 of the cover member 54 opposes the inner side surface of the second peripheral wall 40 of the second housing member 28, an increase in the size of the second housing member 28 can be suppressed.

Moreover, as described above, in a state in which the cover member 54 is disposed on the inside of the second peripheral wall 40 of the second housing member 28, the inner side surface of the second peripheral wall 40 and the outer side surface of the first peripheral wall 32 of the second housing member 28, and the outer side surface of the third peripheral wall 58 of the cover member 54 oppose each other in the radial direction of urging (the direction of arrow C and the direction of arrow D in FIG. 3A and FIG. 3B). For this reason, the space on the inside of the cover member 54 and the space on the vehicle rear side of the second peripheral wall 40 of the second housing member 28 are connected to each other via a gap between the vehicle front side end 58A of the third peripheral wall 58 and the second bottom wall 38 of the second housing member 28 and a gap between the second peripheral wall 40 or the first peripheral wall 32 and the third peripheral wall 58.

Here, the gap between the second peripheral wall 40 or the first peripheral wall 32 and the third peripheral wall 58 curves with respect to the gap between the vehicle front side end 58A of the third peripheral wall 58 and the second bottom wall 38 of the second housing member 28. For this reason, foreign matter can be suppressed from entering the inside of the cover member 54 through the gap between the second peripheral wall 40 or the first peripheral wall 32 and the third peripheral wall 58 and through the gap between the vehicle front side end 58A of the third peripheral wall 58 and the second bottom wall 38 of the second housing member 28, from the vehicle rear side of the second peripheral wall 40. Furthermore, a lubricating member such as grease that has been applied to the flat spiral spring 50, the shaft member 52, etc. can be suppressed from running to the outside of the cover member 54 through the gap between the vehicle front side end 58A of the third peripheral wall 58 and the second bottom wall 38 of the second housing member 28 and through the gap between the second peripheral wall 40 or the first peripheral wall 32 and the third peripheral wall 58.

The projecting pieces 62 are formed in the cover member 54, and when attaching the cover member 54 to the second housing member 28, the projecting pieces 62 enter the hole portions 64 of the second housing member 28. Here, the guide surfaces 66 are formed on the vehicle rear side end portions of the hole portions 64, and when attaching the cover member 54 to the second housing member 28, the distal ends (vehicle front side ends) of the projecting pieces 62 are brought into abutting contact with the guide surfaces 66 of the hole portions 64 of the second housing member 28. When the cover member 54 is moved in the vehicle forward direction in this state, the projecting pieces 62 are guided by the guide surfaces 66 of the hole portions 64 to the insides of the hole portions 64. Due thereto, the cover member 54 can be easily attached to the second housing member 28.

Furthermore, in a state in which the projecting pieces 62 are entered in the hole portions 64, the surfaces of the projecting pieces 62 that are inward in the radial direction of the third peripheral wall 58 of the cover member 54 oppose the inner peripheral surfaces of the hole portions 64 that are inward in the radial direction of the third peripheral wall 58 of the cover member 54. Due thereto, displacement of the projecting pieces 62 inward in the radial direction of the third peripheral wall 58 is suppressed by the inner peripheral surfaces of the hole portions 64 that are inside in the radial direction of the third peripheral wall 58. Due thereto, displacement of the cover member 54 inward in the radial direction of urging (e.g., inward tilting of the cover member 54), which is the radial direction of rotation of the rotational urging force of the flat spiral spring 50, including deformation of the cover member 54 inward in the radial direction of urging (the direction of arrow D in FIG. 3A, etc.), can be suppressed.

Moreover, in a state in which the projecting pieces 62 are entered in the hole portions 64, the surfaces of the projecting pieces 62 that are outward in the radial direction of the third peripheral wall 58 of the cover member 54 oppose the inner peripheral surfaces of the hole portions 64 that are outward in the radial direction of the third peripheral wall 58 of the cover member 54. Due thereto, displacement of the projecting pieces 62 outward in the radial direction of the third peripheral wall 58 of the cover member 54 is suppressed by the inner peripheral surfaces of the hole portions 64 that are outward in the radial direction of the third peripheral wall 58 of the cover member 54. Due thereto, displacement of the cover member 54 outward in the radial direction of urging (e.g., outward tilting of the cover member 54), including deformation of the cover member 54 outward in the radial direction of urging (the direction of arrow C in FIG. 3A, etc.), can be suppressed.

In this way, in the present exemplary embodiment, displacement of the cover member 54 outward and inward in the radial direction of urging can be suppressed by the second housing member 28. For this reason, it is not necessary to provide a special member different from the second housing member 28 in order to suppress displacement of the cover member 54 outward and inward in the radial direction of urging. Because of this, an increase in the number of parts of the webbing take-up device 10 can be suppressed.

In the present exemplary embodiment, the second peripheral wall 40 that configures the suppressing portion as the placement portion is substantially C-shaped. However, the second peripheral wall 40 may also be annular. Furthermore, the cover member 54 is disposed on the inside of the second peripheral wall 40 serving as the placement portion. However, for example, plural projections serving as the suppressing portion may be formed every predetermined interval in the circumferential direction of the third peripheral wall 58 of the cover member 54 on the outer side (the direction of arrow C in FIG. 3A, etc.) of the cover member 54 in the radial direction of urging, so that displacement of the cover member 54 outward in the radial direction of urging, including deformation of the cover member 54 outward in the radial direction of urging, is suppressed by the plural projections. That is, the suppressing portion is not limited to a configuration where the cover member 54 is disposed on the inside thereof.

Moreover, in the present exemplary embodiment, the gear 36 that configures the speed reduction gear train is housed on the inside of the first peripheral wall 32 that configures the suppressing portion as the housing portion. However, parts of other devices such as the lock mechanism 18, the pretensioner 20, and a tension reducer that reduces the rotational urging force of the flat spiral spring 50 transmitted to the spool 14 may also be housed in the housing portion.

What is claimed is:

1. A webbing take-up device comprising:
    a device body having a spool on which a webbing is taken up and stored;
    an urging member that urges the spool in a take-up direction by rotational urging force;
    a cover member that is provided at the device body and inside which the urging member is housed; and
    a suppressing portion that is configured to suppress displacement of the cover member toward an outside in a radial direction of urging, which is a radial direction of rotation of the rotational urging force,
  wherein:
    a first wall portion projecting toward a side of the device body is formed at the cover member such that the cover member opens toward the side of the device body,
    a second wall portion projecting toward a side of the cover member from the side of the device body is provided at the device body, the second wall portion structuring the suppressing portion,
    the second wall portion opposes the first wall portion from the outside in the radial direction of urging such that the first wall portion and the urging member are disposed inside the second wall portion in the radial direction of urging,
    whereby the displacement of the first wall portion of the cover member toward the outside in the radial direction of urging is suppressed by the second wall portion.

2. The webbing take-up device of claim 1, wherein a third wall portion structuring the suppressing portion is provided at the device body, the third wall portion housing a member different from the cover member and the urging member, and the third wall portion opposing the first wall portion from outside in the radial direction of urging.

3. The webbing take-up device of claim 2, wherein the third wall portion is a peripheral wall disposed so as to substantially surround the member in the radial direction of urging.

4. The webbing take-up device of claim 1, wherein the suppressing portion is configured to suppress displacement of the cover member toward an inside in the radial direction of urging.

5. The webbing take-up device of claim 1 further comprising a projecting portion and a hole portion structuring the suppressing portion configured to suppress displacement of the cover member toward the outside and an inside in the radial direction of urging, wherein
    the projecting portion is provided at an end of the first wall portion at a cover member opening side, and projects from the end toward the cover member opening side, the hole portion is provided at the device body, and is configured such that the projecting portion is entered in the hole portion,
    an inner peripheral portion of the hole portion opposes the projecting portion in the radial direction of urging in a state in which the projecting portion enters in the hole portion, and
    due to the projecting portion abutting the inner peripheral portion of the hole portion, a portion of the covering member, which portion opposes the urging member in the radial direction of urging, is suppressed from being displaced toward the outside and the inside in the radial direction of urging.

6. The webbing take-up device of claim 5, wherein a guide surface is formed at the hole portion, and the guide surface is configured to guide the cover member to an attachment position in the device body at which the cover member is attached by the projecting portion of the cover member being engaged with the hole portion when attaching the cover member to the device body.

7. The webbing take-up device of claim 1, wherein the first wall portion is a peripheral wall of the cover member, and the second wall portion is a peripheral wall disposed so as to substantially surround the cover member in the radial direction of urging.

* * * * *